(12) United States Patent
Ait-Mohktar (10) Patent No.: US 9,483,733 B2
(45) Date of Patent: Nov. 1, 2016

(54) GLOBAL REGULAR EXPRESSION BACKREFERENCES

(71) Applicant: Xerox Corporation, Norwalk, CT (US)

(72) Inventor: Salah Ait-Mohktar, Meylan (FR)

(73) Assignee: XEROX CORPORATION, Norwalk, CT (US)

( * ) Notice: Subject to any disclaimer, the term of this patent is extended or adjusted under 35 U.S.C. 154(b) by 531 days.

(21) Appl. No.: 14/021,400

(22) Filed: Sep. 9, 2013

(65) Prior Publication Data

US 2015/0074034 A1    Mar. 12, 2015

(51) Int. Cl.
G06F 17/30    (2006.01)
G06N 5/02    (2006.01)

(52) U.S. Cl.
CPC ......... *G06N 5/022* (2013.01); *G06F 17/30427* (2013.01); *G06F 17/30929* (2013.01)

(58) Field of Classification Search
USPC ................................................. 707/741, 769
See application file for complete search history.

(56) References Cited

U.S. PATENT DOCUMENTS

| | | | | |
|---|---|---|---|---|
| 2009/0138437 A1* | 5/2009 | Krishnamoorthy | | G06F 17/30448 |
| 2009/0138498 A1* | 5/2009 | Krishnamoorthy | | G06F 17/30427 |
| 2014/0108414 A1* | 4/2014 | Stillerman | .......... | G06F 17/3048 707/741 |
| 2014/0310302 A1* | 10/2014 | Wu | .................. | G06F 17/30442 707/769 |

OTHER PUBLICATIONS

U.S. Appl. No. 13/410,827, filed Mar. 2, 2012, Ait-Mokhtar.
Alkhateeb, F., et al. "Extending SPARQL with Regular Expression Patterns (for Querying RDF)," Web Semantics, Apr. 2009, 7(2):57-73.
Aït-Mokhtar, S. "A Framework to Generate Set of Terms from Large Scale Medical Vocabularies for Natural Language Processing," CSCT Workshop, University of Potsdam, Germany, Mar. 19, 2013, pp. 1-6, available at http://www.aclweb.org/anthology/W13-0401.
Bollacker, K., et al. "Freebase: A Collaboratively created graph database for structuring human knowledge," SIGMOD'08, Jun. 9-12, 2008, pp. 1247-1249.
Broekstra, J., et al. "Sesame: A Generic Architecture for Storing and Querying RDF and RDF Schema", The Semantic Web—ISWC, 2002, pp. 54-68.
Cheng, W., et al. "Automated Feature Generation from Structured Knowledge", Proc. of the 20$^{th}$ ACM International Conf. on Information and knowledge management, CIKM'11, 2011, pp. 1395-1404.

(Continued)

*Primary Examiner* — Cam-Linh Nguyen
(74) *Attorney, Agent, or Firm* — Fay Sharpe LLP (57) ABSTRACT

A system and a method are provided for querying a knowledge resource. The querying system is configured for executing queries in a query language that accepts global backreferences that are not limited to a being located in the condition including a regular expression (regex) to which the global backreference refers. In the method, an input query is received, a query based thereon containing one or more global backreferences is executed, and results are retrieved. One condition of the query includes a regex that identifies strings that match the regex. The regex includes one or more capturing groups for capturing substrings of an identified matching string. The global backreference retrieves the captured substring(s). Each global backreference in the query can be a remote backreference, which is outside the regex condition to which it refers, or a local backreference, which is in the same condition as the regex.

21 Claims, 2 Drawing Sheets

(56) References Cited

OTHER PUBLICATIONS

Cho, J., et al. "A Fast Regular Expression Indexing Engine", Proc. of the 18$^{th}$ Intl. Conf. on Data Engineering, 2002, pp. 419-430.
Graefe, G. "Query Evaluation techniques for large databases," ACM Computing Surveys, Jun. 1993, 25(2):73-169.
Kasneci, G. et al. "NAGA: Harvesting, Searching and Ranking Knowledge," Proc. of the 2008 ACM SIGMOD Intl. Conf. on Management of data, SIGMOD'08, 2008, pp. 1285-1288.
Kochut, K.J., et al. "SPARQLeR: Extended SPARQL for Semantic Association Discovery," The Semantic Web: Research and Applications, vol. 4519 of Lecture Notes in Computer Science, 2007, pp. 145-159.
Lee, J., et al. "Processing SPARQL queries with regular expressions in RDF databases" BMC Bioinformatics, 2011, 12(S-2):S6, pp. 1-11.
Suchanek, F.M., et al. "YAGO: A core of semantic knowledge unifying WordNet and Wikipedia" 16$^{th}$ Intl. World Wide Web Conf., 2007, pp. 697-706.
Wilkinson, K., et al. "Efficient RDF Storage and Retrieval in Jena2" SWDB'03, 2003, pp. 131-150.
Broekstra, J., et al. SeRQL: An RDF Query and Transformation Language (2004), pp. 1-15, downloaded from gate.ac.uk/sale/dd/related-work/SeRQL.pdf.
Garlik, Steve H., et al. SPARQL 1.1 Query Language, downloaded from http://www.w3.org/TR/sparql11-query/ (Mar. 2013), p. 1.
Gennick, J., et al., "Oracle Regular Expressions Pocket Reference," O'Reilly & Associates, Inc. (2003), pp. 1-53.

\* cited by examiner

GLOBAL REGULAR EXPRESSION BACKREFERENCES

The exemplary embodiment relates to knowledge base systems and in particular to a method for querying a knowledge base with global regular expression back references.

A significant part of the information available in knowledge resources is stored as text, string literals, or as identifiers, i.e., strings of characters referring to entities and concepts which are used for collecting facts about entities. For example, large open linked-data resources, such as Beda, Yago, and Freebase, contain millions of strings representing entities, such as names of people, organizations, and locations. These database entries are often multi-token. For example, string literals that are names of people may include a family name, one or more given names, and occasionally a modifier, such as Jr. Identifiers for types of locations include strings such as "Rivers in France." The ability to use regular expression (regex) patterns to query string or substring elements is thus a useful tool for exploiting such resources in applications. Existing query languages and query engines used in knowledge base (KB) systems often permit querying using regex as filters to constrain query results, or for transforming fetched string literals using regex capturing groups and backreferences. However, the backreferences are able to operate only locally, i.e., inside the replacement function where the corresponding regex and capturing groups are specified.

In some cases, users may want to extract substrings that match a regex pattern from the string literals or identifiers of a KB, or substrings for which the KB model satisfies some conditions involving properties defined by the KB ontology. Current systems are not able to achieve this efficiently, if at all.

INCORPORATION BY REFERENCE

The following references, the disclosures of which are incorporated herein in their entireties by reference, are mentioned:

U.S. application Ser. No. 13/410,827, filed Mar. 2, 2012, entitled EFFICIENT KNOWLEDGE BASE SYSTEM, by Salah Aït-Mokhtar.

BRIEF DESCRIPTION

In accordance with one aspect of the exemplary embodiment, a method for querying a knowledge resource includes providing a querying system which is configured for executing queries in a query language that accepts global backreferences that are not limited to being located in a respective condition which includes a regular expression to which the global backreference refers. An input query is received which seeks information from the knowledge resource, with the querying system, based on the input query, a query containing a global backreference is executed. This includes retrieving results from the knowledge resource responsive to the query. The query includes a set of one or more conditions. A first of the conditions includes a regular expression that identifies strings in the knowledge resource that match the regular expression. The regular expression includes a capturing group for capturing a substring of an identified matching string. The global backreference retrieves the substring captured by the capturing group. The global backreference includes a remote backreference which is outside the first condition. At least one of the results of the query and information based on the results is output.

In accordance with another aspect of the exemplary embodiment, a querying system includes memory which stores instructions for executing a query for retrieving results from an associated knowledge resource. The query includes at least a first condition comprising a regular expression, the query being constructed in a query language that accepts global backreferences that are not limited to being located in a respective query condition which includes a regular expression to which the global backreference refers and a processor which executes the instructions.

In accordance with another aspect of the exemplary embodiment, a method of querying a knowledge resource includes generating a query in query language that accepts global backreferences that are not limited to a being located in a respective condition which includes a regular expression to which the global backreference refers. The query includes a set of clauses including a first clause which includes a regular expression and a second clause that includes a global backreference. The regular expression is configured for identifying strings in a knowledge resource that match the regular expression. The regular expression includes a capturing group for capturing a substring of an identified matching string. The global backreference in the second clause retrieves the substring captured by the capturing group. The query is executed to retrieve results from a knowledge resource that are responsive to the query, and storing at least one of the retrieved results and information based thereon. One or more of the steps of the method may be implemented by a processor.

DETAILED DESCRIPTION

Figure 1:
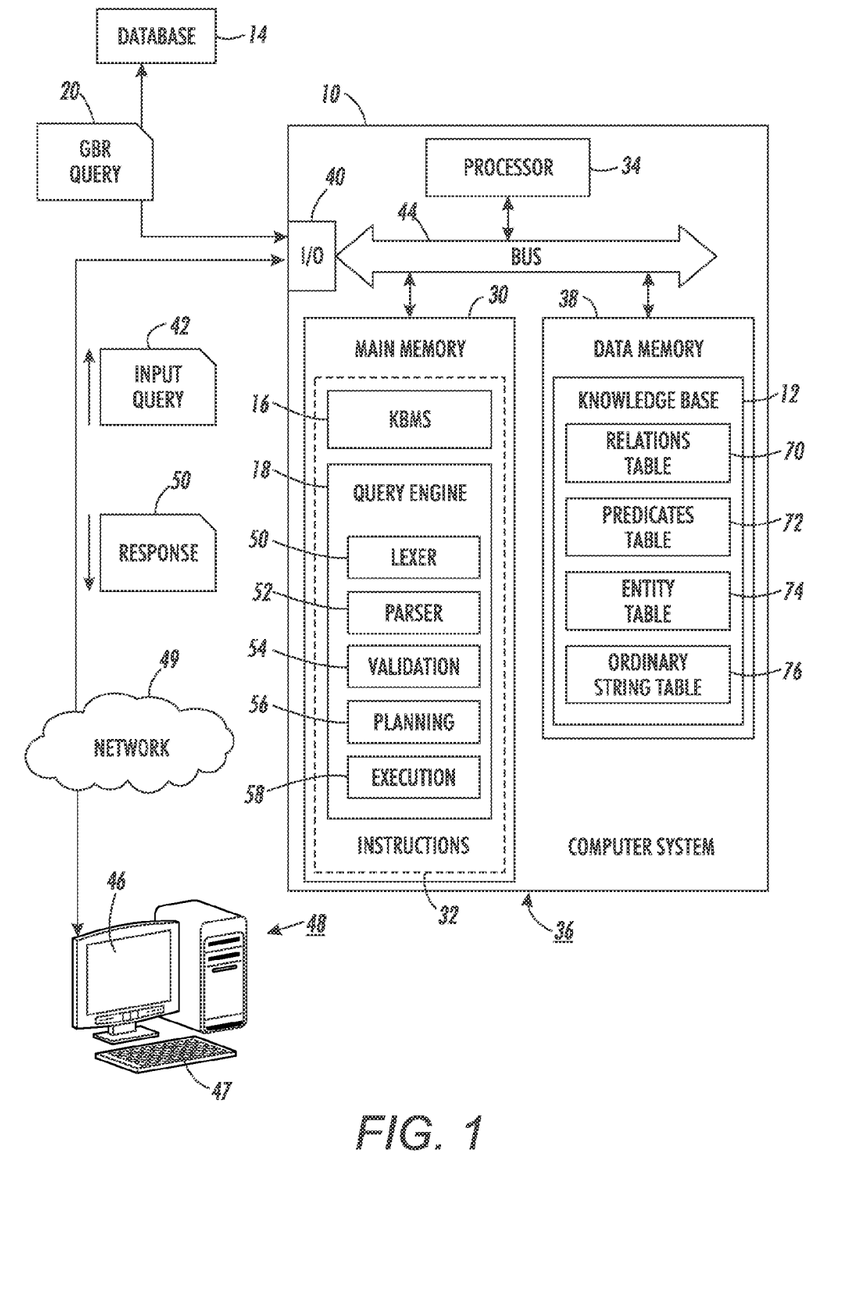
FIG. 1 is a functional block diagram of a system for querying a knowledge base with queries that include global backreferences, in accordance with one aspect of the exemplary embodiment.

With reference to FIG. 1, an exemplary system 10 for querying a knowledge resource, such as a knowledge base 12 or database 14, is shown. A knowledge base management system (KBMS) 16 using a structured query language controls the creation and access to the data in the knowledge base. A query engine 18 queries the knowledge base 12 (or the associated database 14) with a query containing a global backreference (GBR query) 20 constructed in a query language that integrates regular expression (regex) capturing groups and backreferences to the captured groups in the query globally, i.e., backreferences to captured substrings can be used as nodes anywhere in the query graph patterns.

An exemplary query language is a Resource Description Framework (RDF) query language able to retrieve and manipulate data stored in RDF format. A commonly-used query language is SPARQL, which allows a query to contain triple patterns, conjunctions, disjunctions, and optional patterns. Illustrative examples herein use the SPARQL notation, however it is to be appreciated that any suitable query language which allows the use of regex can be employed.

By "global backreference," it is meant a backreference to a regex capturing group, where the global backreference is not limited to being within the condition which contains the regex and thus can be located anywhere in the query. Each global backreference in a query can be a local backreference or a remote backreference.

By "remote global backreference," or simply "remote backreference," it is meant a global backreference to a regex capturing group, where the global backreference is not within the condition which contains the regex and thus can be located anywhere else in the query. This allows using regex as filters on strings, or to transform fetched strings with regex backreferences, or to express additional conditions on captured substrings, with regard to the content of the knowledge base. Although it is possible to simulate such queries in conventional systems by means of regex-based filters, variable binding and string replacement functions, the global integration of regex backreferences is advantageous because it yields more concise queries and, in some cases, faster query execution.

The term "local backreference" is used herein to refer to a conventional type of backreference to a regex capturing group which is limited to the condition which contains the regex.

A "global backreference query" or simply "query" includes a set of two or more clauses, at least one of the clauses being a condition which expresses a constraint on the results retrieved, at least one of the conditions including a regular expression that identifies matching strings in the knowledge resource and at least one of the clauses including a backreference to a capturing group of the regular expression, and wherein the clause containing the global backreference can be a different one from the clause containing the most recent regular expression in the query to which that global backreference refers.

A string literal or "string", as used herein, is a string of characters that is a constant value. String literals are used, for example, to store the full name of an entity, such as a person, a location, or the like, which typically exists in the real world.

A "conceptual entity" is used to enable facts about a given entity to be stored and is given a unique identifier, such as an alphanumeric string of characters, which allows reference to be made to the same ENTITY in given facts. In some cases, the alphanumeric string used as the identifier is the real name of the entity, but it need not be. The facts are stored as "properties" of the conceptual entity. For example, a conceptual entity of the type person could have the identifier William_Shakespeare to refer to the entity William Shakespeare in different facts although the identifier could equally well be more arbitrary, such as X-32. This conceptual entity could have a name property of William Shakespeare (a string literal) and a was-born-in property of Stratford-upon-Avon (also a string literal).

A "regular expression" or "regex" is a formal way to refer to a set of strings of characters. There may be 0, 1, 2, or more strings in the set that are found in the knowledge base. Specifically, a regular expression is a sequence of text characters, some of which are understood to have symbolic meaning, such as operators, and some of which have their literal meaning, that together can automatically identify textual material of a given pattern, or process a number of instances of it that can vary from a precise equality to a very general similarity of the pattern. Different operators are used to generate the regular expression, and may differ depending on the query language used. The operators are used to express conditions on the strings that match the regular expression. For example, in the examples used below, the following notations are used:

Regular expressions are denoted by the word regex, followed by a pair of parentheses, one at the beginning and one at the end of the regular expression.

Capturing groups, which are used to capture a part of a string that matches a regex (the captured part being a substring), are expressed using additional parentheses, within the regex parentheses. These provide access to the substring, provided that the entire input string matches the regular expression.

Global backreferences are noted in the standard way: \n, where n is a number in a sequential numbering scheme (typically an integer) that refers to the nth captured group of the last matched regex. The number immediately follows the backslash symbol, and each new backreference is given a new number in the numbering sequence. The same numbering sequence is used for both local and remote global backreferences so that a given query can include zero, one or more local backreferences and zero, one or more remote global backreferences, the backreferences being numbered in the order in which they appear in the query. For example, a first global backreference \1 refers to a first capturing group and may be a local backreference while a second global backreference \2 refers to a second, different capturing group and may be a remote backreference, or vice versa, or both global backreferences \1 and \2 may be of the same type, e.g., both local or both remote backreferences.

A plus sign "+" following a specified character serves as an operator which specifies a string (or substring) that begins with that character. For example "A+" in a regular expression defines the set of strings that include at least one letter A.

Inside a regular expression, a circumflex "^" indicates the start of the string, except when placed straight after a square bracket "[", where it indicates negation; a dot "." indicates any character; an asterisk "*" indicates any number of the character(s) that precede(s) it (0, 1 or several); a "+" indicates at least one of the preceding character(s); and a dollar symbol "$" indicates the end of a string.

A question mark "?" preceding an identifier indicates that it is a variable node.

As will be appreciated, the method is not limited to any particular symbols.

Two examples will now be provided to demonstrate the use of global backreferences.

The BIND function gives a value to a variable node. STR turns an identifier into a string literal. URI performs the reverse, turning a string into an identifier.

EXAMPLE 1

In this example, the aim is to obtain a large list of family names and use it as a source of a lexical feature for a Named Entity Recognition system. The 2012 download of Freebase (see, Kurt Bollacker, et al., "Freebase: a collaboratively created graph database for structuring human knowledge," Proc. 2008 ACM SIGMOD Intern'l Conf. on Management of Data, pp. 1247-1250) includes 2.1 million entities of type /people/person, each one having a /type/object/name property. The value of this property is the full name string of the person. There does exist a property called /people_with_this_family_name, linking family names to people, however, it is not systematically instantiated, i.e., only a few of the entities of type /people/person are associated with this fact. Thus, it would be advantageous to use the name property value to extract all the family names from the name strings, using regex matching.

As an example, TABLE 1 illustrates a first query expressed in a conventional query language (SPARQL), which uses REPLACE/BIND operations to extract a family name from a text string that is denoted as being of the type /name. As will be appreciated, text strings that are identified in a database as being an ENTITY of type /person often include one or more given names, initials, titles, and so forth, in addition to the family name. The purpose of the query is to remove these parts from the string, leaving only the family name. As will be appreciated, the query itself is not intended to be limiting and could include more or different conditions.

TABLE 1

| 1 | SELECT ?family_name |
|---|---|
| 2 | WHERE |
| 3 | { |
| 4 | ?p /type/object/type /people/person. |
| 5 | ?p /type/object/name ?name. |
| 6 | FILTER regex (?name, "^[ ,]+?␣ ((([Dd]e[rs]?|[Vv][a|o]n) ␣ )*\p{Lu}['\p{Ll}] [\p{L}-']+$") |
| 7 | BIND(REPLACE(?name, "␣ ((([Dd]e[rs]?|[Vv][a|o]n)␣ )*\p{Lu}['\p{Ll}] [\p{L}-']+$", "") AS ?header) |
| 8 | BIND(REPLACE(?name, CONCAT(?header ,"␣ "), "") AS ?family_name). |
| 9 | } |

In line 6, the regex condition, denoted regex, takes as input two parameters, the retrieved string (?name—which is a node variable that will have the name of the entity as a value during the query execution) and a regular expression. The condition filters the retrieved strings to identify retrieved strings that match the regular expression. The ^following the first square bracket indicates negation, i.e., the regex does not accept a comma in the first part of the name that precedes a blank space ␣. The asterisk * indicates that these characters may occur more than once. Following the space is \p {Lu}, which means any upper case Unicode character (i.e., letters including accented letters), a square bracket containing an apostrophe and p{Ll} (meaning any lowercase Unicode character). This means that the upper case character is followed by a lowercase character, or an apostrophe. The next square bracket contains \p{L}-' which means, any Unicode character, hyphen or apostrophe, which can be repeated one or more times, as indicated by the plus symbol +.

This query could also be achieved by writing two distinct queries and linking them programmatically.

TABLE 2 shows how the first query could be implemented with a global backreference in a modified query language (referred to herein as SPARQL-GB). As will be appreciated, the use of SPARQL as a basis for the exemplary query language is intended to be exemplary only, and for some applications, a query language may be developed which is particularly suited to the database and/or type of query to be implemented. It is also to be appreciated that the existing SPARQL query language cannot be modified without permission. However, a query language can be formulated to perform similarly to the SPARQL-GB queries shown in TABLES 2 and 4, by adapting an existing query language to accept the global backreference functionality.

TABLE 2

| 1 | SELECT \1 |
|---|---|
| 2 | WHERE |

TABLE 2-continued

| 3 | { |
|---|---|
| 4 | ?p /type/object/type /people/person. |
| 5 | ?p /type/object/name ?name. |
| 6 | FILTER regex (?name, "^[ ,]+?␣ ((([Dd]e[rs]?|[Vv][a|o]n)␣ )*\p{Lu}['\p{Ll}] [\p{L}-']+$") |
| 7 | } |

Here, the remote global backreference occurs in line 1 of the query and selects the captured group matching the captured group (the family name) after a white space character ␣ satisfying ((([Dd]e[rs]?|[Vv][a|o]n)␣ )*\p{Lu} ['\p{Ll}][\p{L}-']+ in the regex of line 6.

In this example, the query selects ?family_name, where there is a person name ?name that satisfies the regex in line 6 (for better readability, the example query considers only a few name particle like de, des, der, von and van that can start the family name). The name should not contain a comma in order to discard Freebase names that do not end with a family name (e.g. John F. Forward, Sr. or Gille Chlerig, Earl of Mar or Sir John Ellerman, 2nd Baronet, etc.). Line 7 and line 8 delete all but the family name substring, and bind variable ?family_name to the result.

EXAMPLE 2

In this example, the aim is to extract from the YAGO knowledge resource (see, Fabian M. Suchanek, et al., "Yago: A Core of Semantic Knowledge," 16th Intern'l World Wide Web Conf. (WWW 2007), pp. 697-706) all the possible triples [L1 locatedIn L2]. Both L1 and L2 are variable nodes. As will be appreciated, text strings that are identified in a database as being an ENTITY of type "location" do not always specify the larger location in which they are located. In the YAGO resource, the relation locatedIn is defined between locations, but only a small subset of the entities of type /location have this property instantiated (only 3.38% of 412,000 locations have this property in the 2009 version, for example). To extend the coverage of this resource, an illustrative query takes advantage of the type property that links YAGO entities to Wikipedia categories: in many cases, a location L has a wikicategory with an identifier (or URI) that contains the preposition "in" followed by the name of another location in which location L is located. For example, the Russian town Kislovodsk does not have a locatedIn property in the 2009 YAGO resource employed, but has the type wikicategory_Spa_towns_in_Russia. Thus, for each location L1 in YAGO that is not already the subject of a locatedIn relation but has a wikicategory that contains the substring "_in_" followed by the identifier of another YAGO location L2, a new triple [L1 locatedIn L2] can be produced. The exemplary query can produce more than 118,000 new locatedIn triples, increasing the coverage of this property from 3.38% to about 28% of the entries in the database.

One approach is to use 2 sub-queries and link their results programmatically. A first query fetches the set of all locations that do not have the desired property but have a wikicategory whose identifier contains the substring "_in_". Then for each resulting wikicategory (the bound variable) from the first query, the user programmatically extracts the final substring following "_in_", and uses it as an initial binding for the second query, i.e., checking if it is the identifier of another location. This solution has two drawbacks: (1) it requires two distinct queries plus writing program code to link them; and (2) getting the value of bound variable from the first query and binding it to corresponding variable in the second query is a clear computational overhead.

A second and more efficient method entails writing a single query that simulates the effect of global regex backreferences with the following steps:

1. Check that the original string matches some sequence conditions with a regex filter;
2. Isolate the desired substrings (to be captured) by deleting their surroundings. Deletions are performed with string replace operations, where the replacement strings are the empty strings;
3. Transform the resulting string to a URI if required, and use it as a regular node in the other query graph patterns.

This second approach is the method used in TABLE 3. TABLE 3 illustrates a second query expressed in SPARQL-GB, which uses REPLACE/BIND operations to extract locations that are in another location.

TABLE 3

```
 1  SELECT     ?L1, ?L2
 2  WHERE
 3  {
 4    ?L1 type wordnet_location_100027167.
 5    FILTER NOT EXISTS {L1 locatedIn ?otherLoc }
 6    ?L1 type ?wikicat
 7    FILTER regex (str(?wikicat), "^
       wikicategory_.*in_[A-Z][a-z, \(\)]+$)
 8    BIND(REPLACE(str(?wikicat), "^
       wikicategory_.*in_", "" ) AS ?tailSubstr).
 9    BIND (URI(?tailSubstr) AS ?L2).
10    ?L2 type wordnet_location_100027167.
11  }
```

In more detail, the output of this query (line 1) is pairs L1 and L2. The set of conditions, contained within the curly brackets, begins on line 4 and ends on line 10. Line 4 searches for all entities in the knowledge base that are of the type location as values of L1. Line 5 filters out those locations from L1 that are already identified as being "in" another location. Line 6 is a condition that identifies the wikicategory types of L1. The condition in line 7 includes a regex. However, backreferences outside the regex condition are not used to refer to this. This condition takes the wikicat variable from line 6 and transforms it from an identifier to a string literal, since regex only apply to strings. The regex filters these strings to identify those types that are of the form wikicategory_, optionally followed by any characters, and then by the preposition "in" followed by a character string with at least one capital letter and any combination of lower case letters, comma, backslash, parentheses (a backslash is placed inside the parentheses to indicate that the parentheses are not to be considered as a capturing group). The ^ ensures that wikicategory is the start of the string. This would retrieve the type wikicategory_Spa_towns_in_Russia, but could also retrieve wikicategory_Historical_towns_in_Russia. The next step is to capture the substring following "in" up to the end of the string, denoted by the $ symbol, which is achieved in line 8 with a BIND/REPLACE pair of functions. The REPLACE function takes as input three parameters: the input string, a regular expression, and a replacement string. Each part of the input string that matches the regular expression is replaced with the replacement string, which in this case, results in the deletion of the matching substring. The term URI in line 9 takes the string literal and turns the value into an identifier, based on the string of characters. In line 10, an extra condition applied is that the captured substring is the identifier in the knowledge base of another location, L2.

TABLE 4 shows how the second query could be implemented in the modified SPARQL query language (SPARQL-GB) with a remote global backreference.

TABLE 4

```
 1  SELECT ?L1, ?L2
 2  WHERE
 3  {
 4    ?L1 type wordnet_location_100027167.
 5    FILTER NOT EXISTS {L1 locatedIn ?otherloc }
 6    ?L1 type ?wikicat .
 7    FILTER regex (str(?wikicat),
       "^wikicategory_.*in_([A-Z][a-z, \(\)]+)$")
 8    BIND(URI(\1) AS ?L2).
 9    ?L2 type wordnet_location_100027167.
10  }
```

In this query, there is an additional pair of parentheses in the condition of line 7 to signify a capturing group that captures substrings which match the pattern [A-Z][a-z, \(\)]+, discussed above. The global backreference \1 in the condition of line 8 is a remote backreference which takes the URI of the captured substring of line 7 as L2 since this makes L2 an identifier. If all the conditions are met, the system outputs L1 and 2.

In both the standard and the modified query languages \1 is a backreference that refers to the value of the first captured group in the regex clause, i.e., the substring corresponding to the family name part in example 1, and to the wikicategory that follows the preposition "_in_" in example 2. As with conventional backreferences, the numbering of backreferences in the present system proceeds from left to right and with increasing depth (i.e., where one capturing group includes one or more other capturing groups each with its own parenthesis). For example, where a first capturing group includes two embedded capturing groups, the first capturing group is accorded \1 and the second and third are numbered \2 and \3 in order of appearance.

In Example 2, therefore, the query selects the pairs [L1, L2], where L1 is a location that does not have property locatedIn, but has a wikicategory whose identifier contains "_in_" followed by a non-empty substring, so that if the part of the identifier that spans from its beginning to the "_in_" substring is deleted, the remaining string part is the identifier of another resource L2 of type location.

As can be seen, the queries generated with global backreferences (TABLES 2 and 4) have fewer steps and also have a shorter execution time than their conventional counterparts.

Returning to FIG. 1, the querying system 10 includes memory 30 which stores instructions 32 for performing the exemplary method and a processor 34 in communication with the memory for executing the instructions. The system may be hosted by one or more computing devices, such as the illustrated server computer 36. Memory 30 or a separate data storage memory 38 stores the knowledge base 12. An input/output device 40 of the system receives an input query 42 to be implemented which is written in a query language, such as the modified SPARQL-GB language described above, that is adapted to accept global backreferences, or receives other information from which the system 10 generates its own GBR query 20. Hardware components 30, 34, 38, 40 of the system 10 communicate via a data/control bus 44. The I/O interface 40 may communicate with one or more of a display 46, for displaying information to users, and a user input device 47, such as a keyboard or touch or writable screen, and/or a cursor control device, such as mouse, trackball, or the like, for inputting text and for communicating user input information and command selections to the processor 34. The display 46 and user input device 47 may form part of a client computing device 48 that is communicatively connected with the computer 36 by a wired or wireless link 49, such as the Internet.

The input query 42 is received and stored in memory, such as memory 38 to be processed by the query engine 16 for query resolving and execution. The illustrated query engine 16 includes various software components, implemented by the processor 34, for ensuring that the query will execute efficiently. These components include a lexer 50, a syntactic parser 52, and validation, planning, and execution components 54, 56, 58. The lexer 50 tokenizes the query into a sequence of tokens. Thus, for example in the query of TABLE 4, SELECT is one token, ?L1 is a second token, the comma is a third token, ?L2 is the fourth token, and so forth. The lexer also performs the lexical analysis, i.e., for each token, it identifies what the meaning of that token is in the query language, e.g., that SELECT is an instruction and that L1 is a variable node because it starts with a question mark, and so forth. The parser 52 performs syntactic parsing of the input query, which includes building the syntactic structure of the query, e.g., that L1 and L2 are to be returned, because they are in the SELECT clause and that lines 4 to line 9 contain the conditions to be checked because they follow the WHERE clause and are in curly brackets. Part of the function of the parser is to parse the query to identify global backreferences and identify for each one, the regular expression to which it refers as being the immediately preceding regular expression in the query, irrespective of whether that regex is located in the same or a different clause of the query as the referring global backreference. The validation component 54 confirms that the query conforms with a set of rules so that it will execute, including rules which check that for each global backreference there is a corresponding capturing group in the regular expression to which it refers. The query planning component 56 performs query planning, which includes optimization of the input query by transforming it into a Query Execution Plan (QEP), a rooted tree of operators, where the leaves are basic graph patterns or predefined functions. The query execution component 58 performs an evaluation of the query, including evaluating the QEP basic clauses against a knowledge resource 12, 18, and combining the results. These results, or information based thereon, may be output as a response 60 to the query or used to update a knowledge resource, such as knowledge base 12, with additional information. For example, in the information above, some of the concepts relating to people (Example 1) and locations (Example 2), may be enhanced with additional facts. These facts which can be retrieved when subsequent knowledge base queries are input that do not need to make use of regular expressions or global backreferences.

Further details on the operation of conventional query engines which can be adapted to the present application, as described below, are to be found in Goetz Graefe, "Query evaluation techniques for large databases," ACM Computing Surveys, 25(2):73-169, June 1993; and Jinsoo Lee, et al., "Processing SPARQL queries with regular expressions in RDF databases," BMC Bioinformatics, 12(S-2):S6, 2011, hereinafter "Lee 2011."

The computer system 10 may include one or more computing devices, such as a PC, such as a desktop, a laptop or palmtop computer, portable digital assistant (PDA), server computer, cellular telephone, tablet computer, pager, combination thereof, or other computing device capable of executing instructions for performing the exemplary method.

The memory 30, 38 may represent any type of non-transitory computer readable medium such as random access memory (RAM), read only memory (ROM), magnetic disk or tape, optical disk, flash memory, or holographic memory. In one embodiment, the memory 30, 38 comprises a combination of random access memory and read only memory. In some embodiments, the processor 34 and memory 30 and/or 38 may be combined in a single chip. The network interface 40 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor 34 can be variously embodied, such as by a single-core processor, a dual-core processor (or more generally by a multiple-core processor), a digital processor and cooperating math coprocessor, a digital controller, or the like. The digital processor 34, in addition to controlling the operation of the computer 36, executes instructions stored in memory 30 for performing the method outlined in FIG. 2.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The query language is constructed to accept and permit the recognition and implementation of global regex back-referencing so that references to captured groups can be used as regular nodes in the query graph patterns. This avoids the artificial and counter-intuitive REPLACE/BIND operations needed in standard query languages, hence making the query more concise and readable, while it can run faster.

In the exemplary embodiment, the querying system 10 may be employed for querying a knowledge resource such as database 14, which may be a database of RDF triples or other knowledge resource, such as Word Net or Freebase, in order to generate information to be added to a knowledge base 12 (or to query the knowledge base itself). An exemplary knowledge base 12 includes a set of tables including a relations table 70, a predicates table 72, and a plurality of argument tables 74, 76, such as an entity table 74 which stores entities and their respective identifiers and a string table 76, which stores strings other than entities (such as person family names, location names, etc.) and their respective identifiers. In the relations table of application Ser. No. 13/410,827, for example, each row contains five numerical slots (columns) corresponding to a 5-tuple:

(1) a relation identifier r used for reification;

(2) a predicate identifier p composed of an order number p' of the predicate (in the predicates table 72) and identifiers $t_1$ and $t_2$ of the types of the two arguments in the relation (drawn from a predefined set of argument types, such as entity, string, and predicate);

(3) an identifier a1 of the first argument arg1 (Subject) of the relation (which can be used to access the argument table identified by $t_1$);

(4) an identifier a2 of the second argument arg2 (Object) of the relation (which can be used to access the argument table identified by $t_2$), or in some cases, simply a value of the argument; and, optionally, (5) a confidence score for the relation (for dealing with uncertain relations; which defaults to 1).

In the case of Examples 1 and 2, for example, the results obtained by the query engine 18 may be added to the relations table (by the KBMS 16) as new relations with the identifiers of the arguments and the predicate. If the arguments (entities in this case) are not already in the entity table 74, this may also be updated by the KBMS to include the newly acquired entities and assign them each an identifier. The updated knowledge base can then be queried using the KBMS to retrieve information which may include some or all of the information that has been added based on the query results.

As will be appreciated, FIG. 1 is a high level functional block diagram of only a portion of the components which are incorporated into a computer system 10. Since the configuration and operation of programmable computers are well known, they will not be described further.

Figure 2:
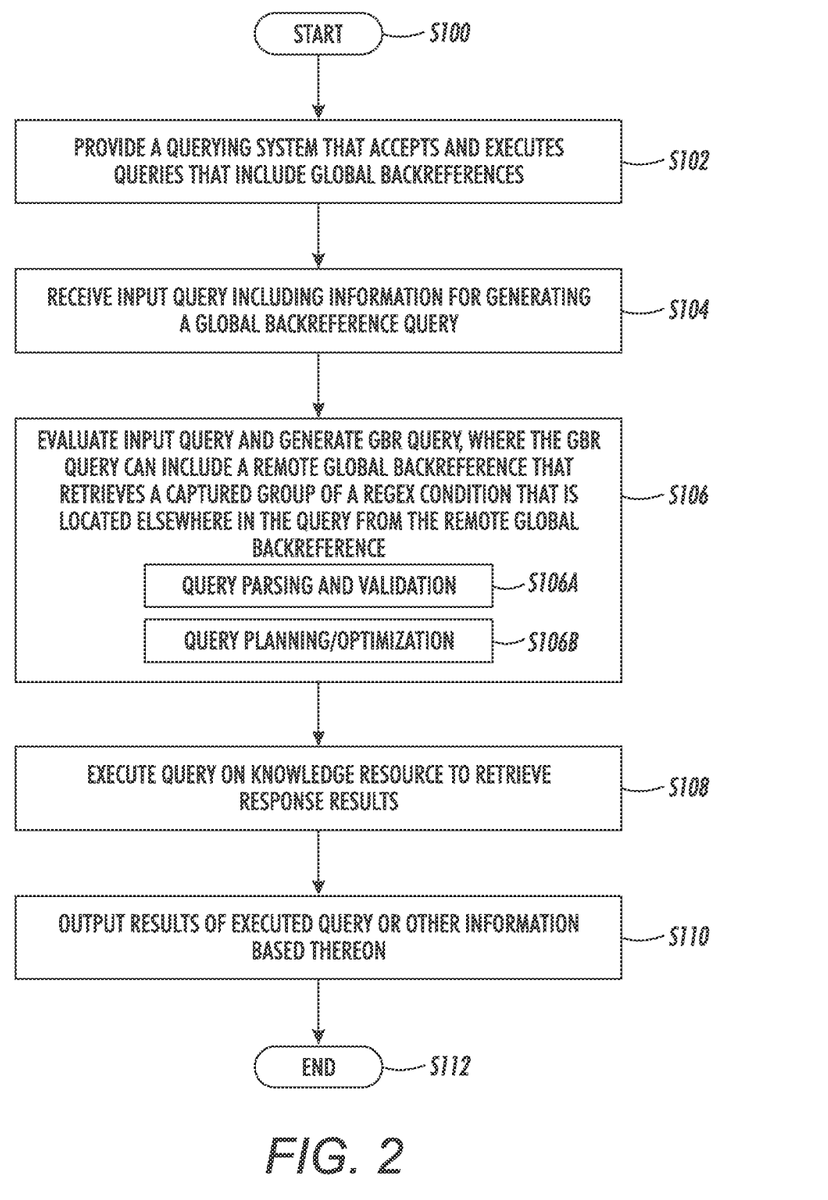
FIG. 2 is a flow chart illustrating a method for querying a knowledge base with queries that include global backreferences, in accordance with another aspect of the exemplary embodiment.

FIG. 2 illustrates an exemplary querying method. The method begins at S100.

At S102, a querying system 10 which accepts and executes queries in a query language that permits global backreferences is provided.

At S104, information for generating a global backreference query 20 is received, such as an input query 42 (which may already include global backreferences).

At S106, the input query 42 is evaluated and a GBR query 20 is generated which may include at least one global backreference (e.g., a remote global backreference) and a set of conditions. At least a first of the conditions is a regex which includes a capturing group for capturing a substring of a string (or identifier) satisfying the condition when that string of which the substring forms a part is present in a knowledge resource, such as knowledge base 12 or database 18 (and typically where the substring is not directly retrievable itself because it does not exist in the knowledgebase as a string or identifier). A remote global backreference outside the first condition retrieves the captured substring. For example, a second of the conditions, different from the first condition, includes the global backreference, as in EXAMPLE 2, or the remote global backreference is located elsewhere in the query, such in a SELECT clause, as in EXAMPLE 1. This step may be performed at least partially automatically by components of the query engine, as discussed below.

At S108, the GBR query 20 is executed by the execution component 58 of the search engine.

At S110, results of the executed GBR query 20 that are retrieved from the knowledge resource in response to the query may be stored, at least temporarily, in memory 18 and may be output from the system or stored to the same or a different knowledge resource such as knowledge base 12.

The method ends at S112.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 36, (for example, an internal hard drive of RAM), or may be separate (for example, an external hard drive operatively connected with the computer 36), or may be separate and accessed via a digital data network such as a local area network (LAN) or the Internet (for example, as a redundant array of inexpensive of independent disks (RAID) or other network server storage that is indirectly accessed by the computer 36, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flow-chart shown in FIG. 2, can be used to implement the query generation and execution method. As will be appreciated, while the steps of the method may all be computer implemented, in some embodiments one or more of the steps may be at least partially performed manually.

As will be appreciated, the steps of the method need not all proceed in the order illustrated and fewer, more, or different steps may be performed.

Further details of the system and method will now be described.

1. Providing a Querying System (S102)

A querying system as described with respect to FIG. 1 may be provided, although any system capable of implementing queries that include global backreferences may be employed.

2. Receiving and Input Query (S102)

The exemplary method takes as input a query in a formal query language that accepts global backreferences and performs similar checks to make sure that it will execute efficiently. The resulting query that is executed thus may be the same as the input query, or may be modified as a result of the query resolution step.

3. Query Resolution

The query resolution of a database or knowledgebase query usually proceeds according to three main steps: syntactic parsing of the input query and its validation; query planning or optimization, which includes optimizing the input query by transforming it into a Query Execution Plan (QEP), a rooted tree of operators, where the leaves are basic graph patterns or predefined functions; and finally the execution of the query by evaluating the QEP basic clauses and combining the results.

The method to implement global backreferencing may be performed similarly to a conventional query resolution process, but may include one or more of the following modifications:

A. Query Parsing and Validation (S106A)

1. The query language lexer 50 and parser 52 are modified to accept backreference identifiers (i.e., \n, n being an integer) as nodes in any query graph pattern or as parameters to predefined functions.

2. An additional validation step may be added, with two conditions:

a) each backreference node \n must have a source regex, and b) this source regex must have a number of capturing groups greater or equal to n.

A source regex is the nearest regex occurring before the backreference in the input query, which can be in the same condition or a different condition of the query, i.e., is not limited to the same condition. The number of capturing groups is computed by counting the number of pairs of opening/closing non-escaped parentheses (except those which are denoted as being treated as regular parentheses, as discussed above). This additional validation step helps to detect possible typographical and logical errors in the input query, e.g., to check that the user did not employ a backreference number which does not have a corresponding capturing group. A given global backreference \n can be used more than once in the query, but each time refers to the same capturing group.

B. Query Planning/Optimization (S106B)

This substep includes a semantic analysis of the query before executing it to optimize it. For example, the order of the conditions may be changed, to make the query run more efficiently. The standard query optimization process selects the query execution plan (QEP) that has an optimal cost in order to maximize the query execution speed. The QEP overall cost is computed from the costs of the basic query clauses (in the QEP tree leaves), including regex-based clauses, which in turn depend on their selectivity with available indexes. In the present method, the cost of a basic query clause containing a backreference node is considered to be the same as the cost of any similar basic clause with a variable node.

C. Query Execution (S108)

This step generates a query ready for execution. The result of query execution is a set of variable bindings. The standard procedure can be modified to also include a set of backreference bindings. The following additional backreference definitions and notations are employed:

1. group(b) is the order number of the capturing group referred by global backreference b (i.e., if b=\n, then group (b)=n).

2. Two global backreferences $b_1$ and $b_2$ are distinct if and only if group($b_1$)≠group($b_2$).

3. source(b) is the source regex of global backreference b, i.e., the nearest regex occurring to the left of b in the original query.

4. backref(r), where r is a regex, is the set of (distinct) global backreferences B, such that source(b)=r for every b in B.

5. REGX(Q) is the set of one, two, or more regular expressions r occurring in query Q.

6. Each query is assigned a set of active global backreferences that is updated during query execution: each time a regex r is matched to a string and the match succeeds, the set of active backreferences will be equal to backref (r). The notation $B_Q$ is used to refer to the set of active global backreferences of query Q. This is relevant where there is more than one regex and respective global back reference(s), so that the ones that are currently relevant to the condition being processed are the only ones that are active.

7. A stack $B_S$ is used to push/pop sets of active global backreferences in case of successful regex matching or backtracking (for example, by retrieving the values of the previous set of active backreferences when a condition does not succeed and the method needs to return to a previous condition).

The standard query execution process (see, for example, Lee 2011) can be modified in the following way:

Set of active backreferences: At the beginning of the query execution the set of active backreferences and stack are both empty: $B_Q \leftarrow \emptyset$, and $B_S \leftarrow [\ ]$ and are populated as the query proceeds.

Regex matching: The regex matching procedure is extended in order to instantiate the relevant global backreferences with the values of the regex capturing groups, if any, and to update the set of active global backreferences $B_Q$. This may be performed as follows:

1. Let r be the regex being matched. Unbound all global backreferences in backref (r).

2. If regex r yields a successful match, then bind each global backreference \n from backref(r) with the value of the nth capturing group of r.

3. Change the active set of global backreferences: push the value of $B_Q$ to the stack $B_S$, and do: $B_Q$ backref(r).

Evaluation of regex-based clauses: Regex-based clauses are the functions that have a regex parameter (e.g., the REGEX and REPLACE functions presented in Examples 1 and 2).

When a regex-based function returns FALSE, then do: $B_Q \leftarrow POP(B_S)$, i.e., this restores the previous set of active global backereferences from the stack so that the correct global backreference set is used when evaluating the preceding clauses again after backtracking.

Evaluation of basic clauses containing backreferences: Basic clauses are basic graph patterns (matching triples in the knowledge base) or predefined functions or procedures (like BIND, URI or REPLACE). If such a basic clause contains one or more global backreferences as nodes or parameters, then do the following at the beginning of the clause evaluation:

1. Check that every mentioned global backreference b is in the active set of backreferences $B_Q$ and that b is bound, i.e., has a value. If not, the clause fails and returns FALSE.

2. If yes, replace the node or parameter b in the clause with the (string) value to which it is bound in $B_Q$, and proceed with the normal evaluation procedure.

4. Returning Results (S110)

The query execution process returns the standard set of variable bindings, plus the global backreference bindings in $B_Q$.

As an example implementation, the exemplary global backreference mechanism can be implemented by extending the query engine of the SKB knowledge store described in U.S. application Ser. No. 13/410,827.

Following this method, the SPARQL 1.1 queries corresponding to Examples 1 and 2 can be written as shown in TABLES 2 and 4 (for better readability, URIs are simplified and namespaces are omitted).

Examples 1 and 2 are rather simple cases since in both, there is only one substring to capture and it occurs at the end of the original string. When using a standard query language (table 1 and table 3), and the capturing group is inside the string, an additional sequence of REPLACE and BIND operations (line 8) may be employed to delete both the left and right surroundings. More generally, when a query needs to refer to n capturing groups, between n and 2n REPLACE/

BIND operations can be employed to get the target substrings, depending on their positions in the original strings.

The exemplary system and method allow integration of a global regex backreferencing mechanism into a knowledge base query engine. The modifications to a conventional query resolver allow it handle such global backreferences.

Global regex backreferencing has two advantages. First, queries tend to be more concise and readable when it comes to searching in the knowledge base for substrings of string literals or identifiers, or to expressing ontological conditions on such substrings (e.g., query in TABLE 1 versus equivalent query with global backreferencing in TABLE 2). Second, such queries can run faster in the case of warm runs and when the number of triple-based graph patterns is small in the query. The cost of disk I/O and triple-scanning is generally significant compared to the BIND/REPLACE in-memory operations that the difference in performance between the present method employing global backreferences and a comparison method using REPLACE/BIND operations to achieve the same result may sometimes be negligible in cold runs, or in queries other than that contain many triple-based operations.

In existing implementations of SPARQL or similar query languages such as the query language of Sesame (see, e.g., Kevin Wilkinson, Craig Sayers, Harumi A. Kuno, and Dave Reynolds. Efficient RDF storage and retrieval in Jena2. Proc. 1st Intern'l Workshop on Semantic Web and Databases (SWDB'03), pp. 131-150, 2003; J. Broekstra, "SeRQL: Sesame RDF query language," in SWAP Deliverable 3.2 Method Design, M. Ehrig, editor, pp. 55-68, 2003), regular expressions can be set in the FILTER clause to apply constraints on resulting string nodes. They can also be used with the REPLACE function to perform replacements in strings. In both cases, backreferences to captured groups in the regex are allowed only locally, in the regex itself or in the replacement parameter of the REPLACE function. In Faisal Alkhateeb, Jean-Francois Baget, and Jérôme Euzenat, "Extending SPARQL with regular expression patterns (for querying RDF), J. Web Semantics: Science, Services and Agents on the World Wide Web, 7(2):57-73, April 2009, the authors extend SPARQL with regular expressions for querying RDF stores, but this extension affects property paths, not nodes, and does not introduce global backreferencing: an arc of a query graph pattern can be labeled with regular expressions in order to match a set of paths. Some of the path regex related features, like property paths and arbitrary length path matching, have been officially integrated into SPARQL 1.1.

Example Evaluation

Test data: A subset of Freebase (from a 2012 dump) containing about 2.2 million entities of type person was used to test Example 1 above, and a subset of the 2009 version of the YAGO knowledge resource containing about 36.2 million facts was used to test Example 2.

Test queries: The two queries of examples, named Q1 and Q2, were tested with and without backreferencing. Q1 scans over about 2.2 million person entities, and Q2 over 412K locations, yielding about 118K pairs of locations.

As a baseline, the query versions were run without remote global backreferencing. The knowledge base system described in application Ser. No. 13/410,827 was used to run both the baseline and the backreferencing versions of the queries instead of using a standard RDF triple store, such as Jena for the baseline, in order to avoid any bias due to the difference in performance on normal queries between these two systems.

TABLE 5 shows the results of the experiment. The reported query execution times are computed by averaging on 10 consecutive warm runs. As expected, for query Q1 the global backreferencing version runs much faster than the baseline, because Q1 contains only 2 triple-based patterns. By contrast, the difference in speed for Q2 is small, because it contains 4 triple-based patterns (and one is negated) that take most of the query execution time. However, there is still a reduction in run time, which could be advantageous.

TABLE 3

Execution time with and without global backreferences (in milliseconds)

|  | Q1 | Q2 |
| --- | --- | --- |
| Baseline (REPLACE/BIND) | 67481 | 23474 |
| Global Backreferencing | 23821 | 22076 |
| Average Factor (x baseline) | x 0.35 | x 0.94 |

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for querying a knowledge resource comprising:
    providing a querying system which is configured for executing queries in a query language that accepts global backreferences that are not limited to being located in a respective condition which includes a regular expression to which the global backreference refers;
    receiving an input query which seeks information from the knowledge resource;
    with the querying system, based on the input query, executing a query containing a global backreference comprising retrieving results from the knowledge resource responsive to the query, the query including a set of conditions, a first of the conditions including a regular expression that identifies strings in the knowledge resource that match the regular expression, the regular expression including a capturing group for capturing a substring of an identified matching string, the global backreference retrieving the substring captured by the capturing group and wherein the global backreference comprises a remote backreference which is outside the first condition; and
    outputting at least one of the results of the query containing the global backreference and information based on the results.

2. The method of claim 1, wherein the regular expression includes at least one operator which expresses a condition on strings in the knowledge resource which match the regular expression.

3. The method of claim 1 wherein the query language accepts both local backreferences and remote backreferences, wherein each local backreference is limited to retrieving a captured substring of a string matching a regular expression that is within the same condition as the local backreference.

4. The method of claim 3, wherein when the query language provides for local and remote backreferences in the query to be numbered with the same sequential numbering system.

5. The method of claim 1, wherein the query language provides that for a query which includes more than one global backreference, each global backreference in a query refers to a captured group of a source regular expression which is an immediately preceding regular expression in the query.

6. The method of claim 1, wherein the query language accepts a remote backreference which is in a condition that is different from the condition which includes the regular expression to which the respective remote backreference refers.

7. The method of claim 1, wherein the query includes a second condition which includes the remote backreference.

8. The method of claim 1, wherein the execution of the query includes:
for each regular expression r, identifying a set B of global backreferences, such that each global backreference b in B has regular expression r as a source regular expression of global backreference b and regular expression r is the nearest regular expression preceding b in the query; and
assigning to the query a set of active global backreferences $B_Q$ that is updated during query execution, such that each time a regular expression r matches a string, the set of active backreferences equals the set B of global backreferences for that regular expression r.

9. The method of claim 1 wherein the outputting comprises updating a knowledge base with information derived from the results of the query.

10. The method of claim 1, wherein the querying system includes a processor which implements the execution of the query.

11. The method of claim 1 wherein the query identifies:
pairs of first and second entities and where the first entity is linked to the second entity by a predefined predicate; or
a family name which is a substring of a name existing in the knowledge resource.

12. A computer program product comprising a non-transitory recording medium storing instructions, which when executed on a computer causes the computer to perform the method of claim 1.

13. A querying system comprising:
memory which stores instructions for executing a query for retrieving results from an associated knowledge resource, the instructions including:
a query engine which executes a query containing a global backreference and retrieves results from the knowledge resource responsive to the query, the query including a set of conditions, a first of the conditions including a regular expression that identifies strings in the knowledge resource that match the regular expression, the regular expression including a capturing group for capturing a substring of an identified matching string, the global backreference retrieving the substring captured by the capturing group and wherein the global backreference comprises a remote backreference which is outside the first condition and outputs at least one of the results of the query containing the global backreference and information based on the results; and
a processor which executes the instructions.

14. The system of claim 13, wherein the query includes at least one global backreference which is a remote backreference that is outside the condition which includes the regular expression to which the remote backreference refers.

15. The system of claim 13, wherein each global backreference in the query is configured for retrieving a captured substring captured by a capturing group of the regular expression to which the global backreference refers when the regular expression matches a string in the knowledge source that includes the substring.

16. The system of claim 13, wherein the query language accepts a global backreference that is located in a different condition from the condition of a query which includes a regular expression to which the global backreference refers.

17. The system of claim 13, wherein the query language accepts both local backreferences and remote backreferences, wherein each local backreference is limited to retrieving a captured substring of a string matching a regular expression that is within the same condition as the local backreference.

18. The system of claim 17, wherein when the query language provides for local and remote backreferences in the query to be numbered with a same sequential numbering system.

19. The system of claim 13, further comprising a knowledge base which stores information in a relation database a knowledge base management system that updates the relation database with information that is based on the retrieved results.

20. The system of claim 13, wherein the instructions include a parser which parses the query to identify global backreferences and identifies the regular expression to which each of the global backreferences refers as the immediately preceding regular expression in the query irrespective of whether it is located in the same or a different clause of the query as the referring global backreference.

21. A method of querying a knowledge resource comprising:
generating a query in query language that accepts global backreferences that are not limited to a being located in a respective condition which includes a regular expression to which the global backreference refers, the query including a set of clauses including a first clause which includes a regular expression and a second clause that includes a global backreference, the regular expression being configured for identifying strings in a knowledge resource that match the regular expression, the regular expression including a capturing group for capturing a substring of an identified matching string, the global backreference in the second clause retrieving the substring captured by the capturing group;
with a processor, executing the query to retrieve results from a knowledge resource that are responsive to the query, and
storing at least one of:
the retrieved results, and
information based on the retrieved results.

* * * * *